United States Patent Office 3,567,648
Patented Mar. 2, 1971

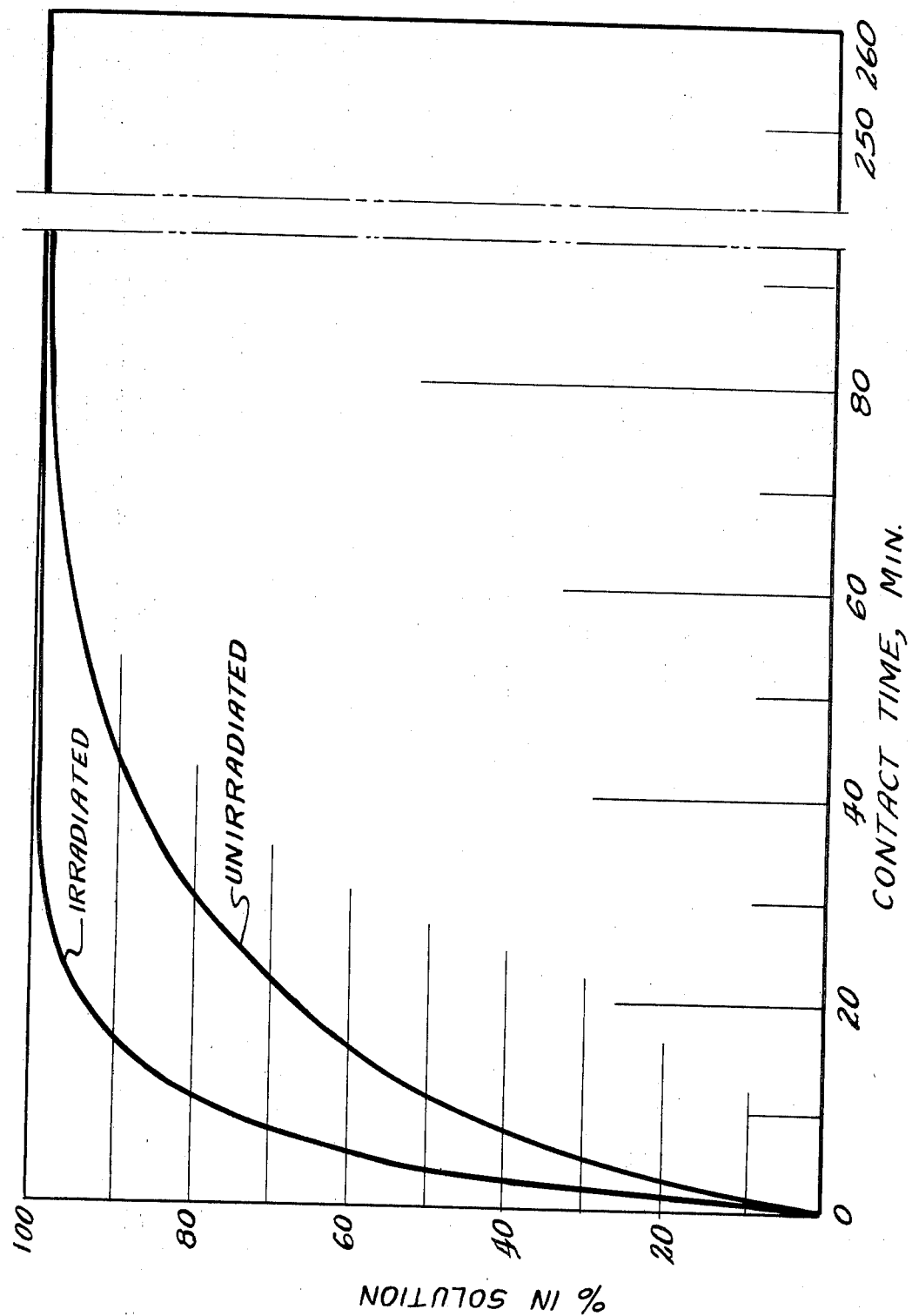

3,567,648
DISSOLUTION OF STAINLESS STEEL CLAD NUCLEAR FUEL ELEMENTS
William J. Walsh and R. Dean Pierce, Naperville, Ill., assignors to the United States of America as represented by the United States Atomic Energy Commission
Filed Apr. 8, 1969, Ser. No. 814,313
Int. Cl. G21c 19/42, 19/44, 19/50
U.S. Cl. 252—301.1                5 Claims

ABSTRACT OF THE DISCLOSURE

The loss by entrainment of nuclear fuel particles in the dissolution of stainless steel cladding with molten zinc can be prevented by mixing a molten salt with the molten zinc to getter any nuclear fuel fines present and enable an essentially complete recovery of nuclear fuel particles.

CONTRACTUAL ORIGIN OF THE INVENTION

The invention described herein was made in the course of, or under, a contract with the United States Atomic Energy Commission.

BACKGROUND OF THE INVENTION

This invention relates to the decladding of a stainless steel clad nuclear fuel element by dissolution with molten zinc. More specifically, this invention relates to a process of preventing the loss of nuclear fuel fines by entrainment in molten zinc and dissolved stainless steel.

There are numerous methods for decladding nuclear fuel elements, many of which involve mechanical steps that include scoring, splitting, and chopping. All of these mechanical decladding processes are expensive and require at least, in some instances, large capital expenditures for equipment. As the nuclear fuel elements are radioactive after discharge from a reactor, maintenance and repair of mechanical equipment used for decladding the nuclear fuel elements is a difficult and time-consuming chore.

It is known that stainless steel dissolves in molten zinc and that this can form the basis for the decladding of stainless steel clad nuclear fuel elements. The principal difficulty with dissolution of stainless steel cladding with molten zinc is the separation of the nuclear fuel particles from the molten zinc-stainless steel solution. During irradiation of a nuclear fuel element, the nuclear fuel, if it is in the form of an oxide, becomes brittle and usually cracks into many different sized pieces, and so there is present in the nuclear fuel element, after irradiation, an entire spectrum of sizes from fines or powders, a few microns in diameter, to pieces over an inch long.

It has also been found that dissolution of stainless steel clad nuclear fuel elements which contain a spectrum of particle sizes, as mentioned above, results in a suspension of these different sized nuclear fuel particles throughout the molten zinc-stainless steel solution. Until now there has not been a method for separating the nuclear fuel particles from the molten zinc-stainless steel solution which is sufficiently efficient to prevent the loss of an economically unacceptable quantity of the nuclear fuel particles in the waste zinc solution. It has been found that the addition of a molten salt to the molten zinc-stainless steel solution results not only in the gettering of substantially all the fines into the salt phase but also, for some unexplained reason, prevents the suspension of nuclear fuel particles in the molten zinc solution and produces a nuclear fuel-free phase and a nuclear fuel-containing phase in the zinc solution.

SUMMARY OF THE INVENTION

This invention comprises adding a molten salt to a molten zinc dissolvent for a stainless steel clad nuclear fuel element in order to form separable nuclear fuel-containing phases from a nuclear fuel-free phase.

BRIEF DESCRIPTION OF THE DRAWING

The single figure is a graph showing the dissolution rates of irradiated and unirradiated steel in molten zinc.

DESCRIPTION OF THE PREFERRED EMBODIMENT

Several experiments were performed to test the various aspects of this invention.

Experiment I

Four sealed stainless steel capsules containing 291 grams of uranium dioxide pellets were melted in alumina crucible at about 1600° C. together with 4 short lengths of stainless steel rods totaling 284 grams of stainless steel. The melt was held in an argon atmosphere of about 3 hours after which the system was allowed to freeze. Inspection of the resulting ingot showed that most of the uranium dioxide pellets were fairly well separated from the stainless steel.

Experiments II and III

In each experiment, four 4½" outside diameter by 5" long stainless steel tubes with welded bottoms were filled with whole uranium dioxide pellets (⅜" diameter by ½"), broken uranium dioxide pellets and uranium dioxide fines and sealed with press-fit stainless steel plugs. The four rods were charged to a graphite crucible containing 5.8 kilograms of zinc, held at 800° C. for about 6 hours with no agitation and allowed to freeze. The resulting ingot was removed from the crucible and sectioned. Upon examination, it was found that most of the uranium dioxide was found at the top of the ingot despite a pellet density of about 10 grams per cubic centimeter; significant quantities of uranium dioxide were found throughout the ingot. Partially dissolved stainless steel had floated to the top of the liquid zinc and remained undissolved although the stainless steel loading in the zinc was only about 5 weight per cent. Excessive fuel losses would have resulted if an attempt had been made to remove a significant fraction of the zinc-stainless steel solution.

Experiment III was identical to the above except that 762 grams of a salt (calcium chloride—15 percent by weight calcium fluoride) was added to the crucible and mild agitation given to the system followed by a quiescent settling period. After sectioning the ingot, it was found that all of the pellets and large uranium dioxide pieces were found at the bottom of the ingot, the salt layer contained large quantities of uranium dioxide fines and the ingot was surrounded by an approximately ³⁄₃₂" thick layer of salt heavily ladened with uranium dioxide. Partially dissolved pieces of stainless steel tubing were found at the salt-metal interface and about 60 to 80% of the zinc phase appeared to be relatively free of uranium dioxide.

Experiments IV and V

A simulated subassembly was constructed of Type 304 stainless steel and consisted of an array of 13 tubes welded to 3 circular plates located at each end and the center of the tubes. The tubes were ⅜" inside diameter, about 12½" in length, with a wall thickness of 35 mils. The plates were 4" in diameter and ¼" thick. Each tube was filled with uranium dioxide pellets ⅜" diameter by ½" long with about 5 percent uranium dioxide fines loaded in the center. The subassembly was submerged in a molten zinc-molten salt mixture maintained at 800° C. The salt composition was the same as used in Experiment III. After about 30 minutes, all tubing in contact with the zinc was observed to have been completely dissolved while the plates were relatively unaffected. An additional 7 hours of contact with modest agitation insured dissolution of the entire subassembly. After dissolution was complete, the system was held at temperature overnight without agitation. A heated transfer line was introduced into the melt and samples were taken at various distances from the bottom of the crucible. After the system was brought to room temperature, the crucible was inspected. In both experiments, the pellets were found distributed in a fairly uniform layer over the vessel bottom and partially covered by the zinc heel. No evidence of undissolved stainless steel was found; hence, it was assumed that complete dissolution of the subassembly was achieved.

In Experiment IV the fuel assembly consisted of 2.681 kilograms of 304 stainless steel and 2.488 kilograms of uranium dioxide and it was charged to 84.5 kilograms of zinc and 5.0 kilograms of a calcium chloride—15 weight percent of calcium fluoride mixture maintained at 810° C. Agitation was accomplished with a single pitch blade 4¾" by ¾" by 1" turning at 150 to 590 r.p.m. Four samples were taken from the crucible. The first sample, taken with the transfer line 5" above the crucible bottom, consisted of 10.6 kilograms of solution which contained 2.92 grams of uranium or 0.13 weight percent of the original uranium charge. The second sample, taken with the transfer line 3" above the crucible bottom, consisted of 48.1 kilograms solution which contained 20.8 grams uranium or 0.95 weight percent of the original charge. The third sample, taken with the transfer line 2" above the crucible bottom, contained 11.35 kilograms solution and 0.939 kilograms salt and contained 1.5 grams uranium or 0.07% of the original charge. The fourth and last sample, taken with the transfer line in the crucible sump, consisted of 13.7 kilograms solution and 3.595 kilograms salt and contained 1.8 percent of the uranium or 0.08 percent of the charge.

In Experiment V, the fuel assembly weighed 2.3 kilograms and contained 2.499 kilograms uranium dioxide. It was charged to a mixture of 75.0 kilograms zinc and 6.5 kilograms of the calcium chloride-calcium fluoride salt. The temperature was maintained at 800° C. for 7 hours with stirring from 425 to 625 r.p.m. Two samples were taken, the first after 380 minutes with the transfer line 3.5" above the crucible bottom consisted of 33.9 kilograms zinc containing 0.118 grams of uranium or $5.4 \times 10^{-3}$ percent of the charge. The second sample was taken after 388 minutes with the transfer line in the cruicible sump and consisted of 40.0 kilograms zinc which contained 0.091 grams uranium or $4.12 \times 10^{-3}$ percent of the charge.

As seen from the above experiments, with the exception of the second sample in Experiment IV, very little uranium was entrained in the zinc-stainless steel solution and, in fact, the uranium dioxide partitioned between the salt phase and the bottom of the zinc-stainless steel solution. Unlike Experiment I, the uranium dioxide fuel was not distributed throughout the zinc solution but settled to the bottom of the crucible.

Experiment VI

This experiment was conducted to test the effect of irradiation on the rate of stainless steel dissolution in zinc. A 0.14" diameter by 2.6" long Type 304 stainless steel rod was irradiated in the Experimental Breeder Reactor-II, at Idaho Falls, Idaho, from July 29, 1965 to Jan. 27, 1966, at a flux of $4.9 \times 10^{13}$ neutrons/cm.$^2$-sec.-MW with average neutron energy of about 400 kev. This irradiation level corresponds to a fuel burnup of about 2.2 atom percent. The irradiated rod was dissolved together with several inactive Type 304 stainless steel rods of identical geometry to provide a comparison of dissolution kinetics. An alumina crucible was charged with 10 kilograms of zinc and heated to 800° C. The irradiated rod together with 6 inactive rods were immersed in the zinc which was mildly agitated. Eleven filtered samples of the zinc-stainless steel solution were taken with sampling times ranging from 4 to 252 minutes after introduction of the rods. The results of this experiment are shown in the figure and demonstrate, although the data are somewhat scattered, that the irradiated stainless steel rod was completely dissolved and, in fact, appeared to have gone into solution more rapidly than the unirradiated rods.

The above described experiments show that it is possible to dissolve stainless steel cladding from irradiated fuel elements without losing a significant amount of fuel particles when the solvent is rejected to waste. Although a particular fuel and a particular salt were used in all the experiments, there is no reason to suppose that other fuels, such as carbides and other salts, such as alkali metal halides or other alkali earth halides would not be operable. These experiments are only meant to be representative of the general type of materials to which this process is applicable. The limits of this process are contained in the appended claims.

The embodiments of the invention in which an exclusive property or privilege is claimed are defined as follows:

1. A process comprising introducing a stainless steel clad nuclear fuel element into a molten zinc-molten salt mixture, whereby the stainless steel dissolves to form a zinc-stainless steel solution and the nuclear fuel partitions between the salt and the bottom of the zinc-stainless steel solution, and separating the nuclear fuel-free zinc-stainless steel solution from the nuclear fuel-containing salt and zinc-stainless steel solution.

2. The process of claim 1 wherein the molten zinc-molten salt mixture is agitated subsequent to the introduction of the nuclear fuel element.

3. The process of claim 2 wherein the molten zinc-molten salt mixture is maintained at a temperature not less than about 800° C. and the nuclear fuel element contains uranium dioxide or a combination of uranium dioxide and plutonium dioxide.

4. The process of claim 3 wherein the molten salt is predominately a mixture of calcium chloride and calcium fluoride and the nuclear fuel element has been irradiated.

5. In the dissolution of stainless steel cladding from an irradiated stainless steel clad oxide nuclear fuel element with molten zinc maintained at a temperature of about 800° C. to form a stainless steel-molten zinc solution, the improvement comprising adding to the molten zinc a calcium chloride-calcium fluoride-containing salt and mixing the salt with the stainless steel-molten zinc solution, whereby oxide nuclear fuel particles partition between the molten salt and the bottom of the stainless steel-molten zinc solution, and separating the oxide-free stainless steel-molten zinc solution from the oxide-containing phases.

References Cited

UNITED STATES PATENTS

| | | | |
|---|---|---|---|
| 3,120,435 | 2/1964 | Chiotti | 75—84.1 |
| 3,284,190 | 11/1966 | Knighton et al. | 23—325X |
| 3,326,673 | 6/1967 | Knighton et al. | 75—84.1 |

HYLAND BIZOT, Primary Examiner

J. E. LEGRU, Assistant Examiner

U.S. Cl. X.R.

23—324, 325; 75—84.1